Oct. 24, 1967     S. S. WISOTSKY     3,349,367
ELECTROHYDROSONIC TRANSDUCER
Filed Oct. 23, 1965                                      4 Sheets-Sheet 2

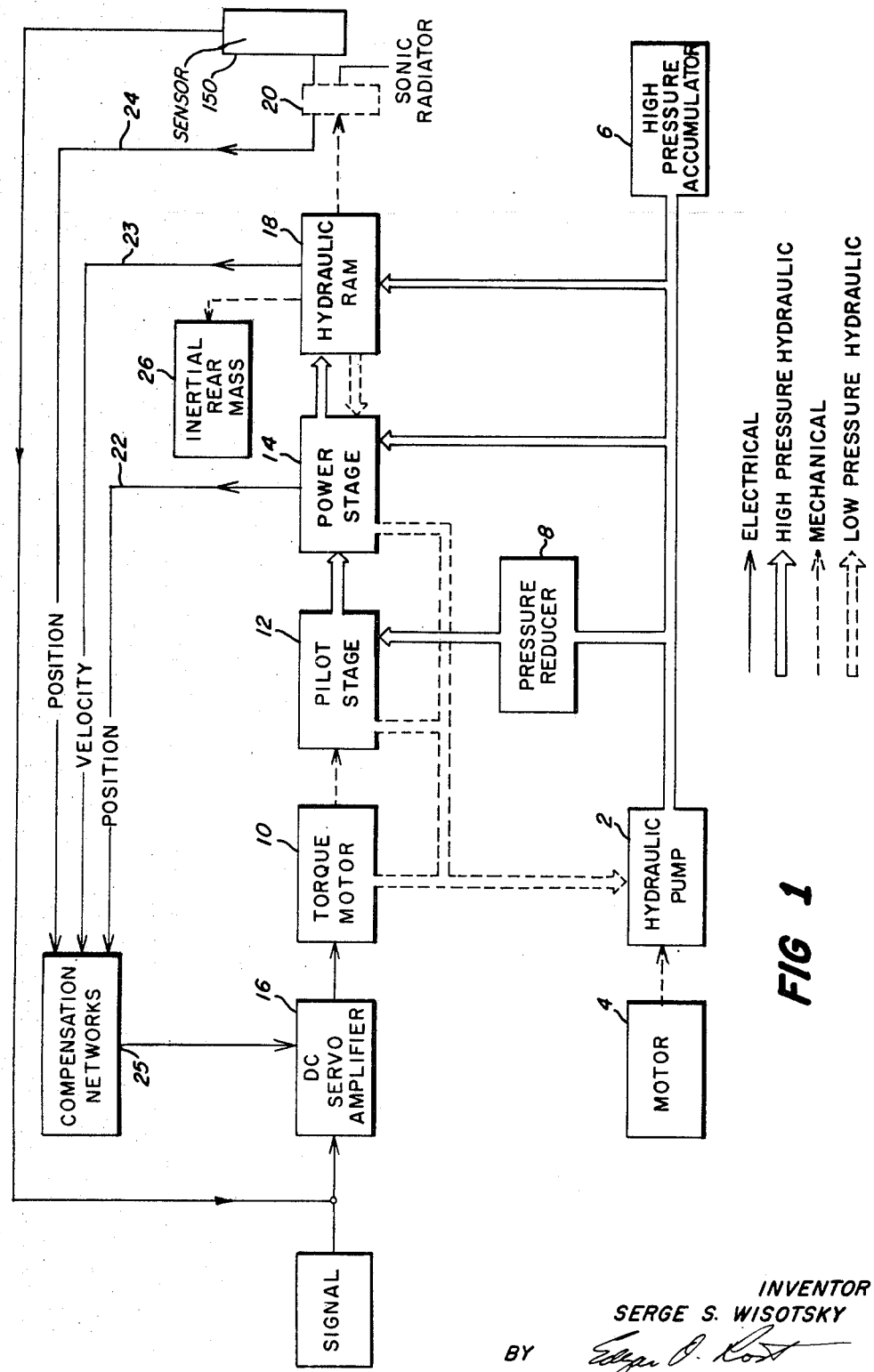

INVENTOR
SERGE S. WISOTSKY
BY
ATTORNEY

Oct. 24, 1967 S. S. WISOTSKY 3,349,367
ELECTROHYDROSONIC TRANSDUCER
Filed Oct. 23, 1965 4 Sheets-Sheet 3

INVENTOR
SERGE S. WISOTSKY
BY
ATTORNEY

INVENTOR
SERGE S. WISOTSKY
BY
ATTORNEY

United States Patent Office 3,349,367
Patented Oct. 24, 1967

3,349,367
ELECTROHYDROSONIC TRANSDUCER
Serge S. Wisotsky, Sharon, Mass., assignor to Raytheon Company, Lexington, Mass., a corporation of Delaware
Filed Oct. 23, 1965, Ser. No. 505,311
1 Claim. (Cl. 340—12)

The present invention relates generally to a method of, and apparatus for, the generation of acoustic vibrations, and more particularly to a device for the generation of broad band, high power, precise remote controlled, fast response, low frequency sonic energy for such purposes as seismic exploration on land and at sea, and transmission of high energy vibrations into finite structures as well as into semi-infinite media such as earth or large bodies of water for echo ranging, communications and acoustic countermeasures.

For the purposes of the specification and the claims the term "sonic" is employed in the sense defined in the text by Hueter and Bolt, entitled, "Sonics," Wiley Publishing Company, New York, 1955, to mean that technology of sound applied to the analysis, measurement, testing and processing of any medium by the use of acoustic or mechanical vibratory energy. The latter term, "mechanical," is associated with the behavior of systems best defined by lumped parameters while the former term, "acoustics," is applied to systems analyzed by distributed parameter or wave techniques. The term "broad band" will hereinafter be employed to connote the frequency spectrum from below one cycle per second to a few thousand cycles per second or those upper frequencies at which the standing waves or resonances of the operative fluid in the system become operationally predominant. Further, the term "broad band" indicates the simultaneous presence of multiple frequencies within the aforementioned frequency range as well as the modulation of a single frequency.

Many different types of acoustic and elastic vibration transducers have been disclosed in the art and a survey of such generators discloses that each one has a serious shortcoming. Generators of the piezoelectric, magnetostrictive and magnetomotive types, all operate at a specified tuned frequency and are consequently limited in their bandwidth to fractions of an octave. It is also difficult to produce vibrations with such sources of any appreciable power capability, particularly at the low frequency end of the sound spectrum. Such devices are also power limited in the excursion of the vibratory source to the order of mils and fractions thereof. Other hydroacoustic devices such as the siren and self-excited hydrodynamic oscillator are essentially fixed frequency devices. The electromagnetic type of oscillating sources may operate over a frequency range as well as a fixed frequency but are inherently bulky due to the fact that it is difficult to obtain the required magnetic forces to produce a steady state condition having a capability greater than 150 lbs. per square inch. Such devices also would be difficult to adapt economically to underwater purposes.

Additional generators have been suggested of the mechanical type employing cranks, cams, single or counter-rotating weights, which are fixed displacement devices having only a single value of power output at a particular frequency and mechanical eccentricity. Vibrating mechanical systems have also employed elongated elastic elements to tune out the mass reactance of the load. Aside from also being a fixed tuned device, such generators cannot be carefully controlled for such purposes as seismic exploration where the amplitude, frequency, duration of the signal and the wave shape of the signal energy must be correlated with the return reflected signals.

In the aforementioned seismic field of operation conventional methods include the use of sparks, mechanical input machines and explosive charges. The resultant shock waves are not only of extremely short duration but destructive to all marine life for considerable distances surrounding the area of exploration. In addition, the gas bubble pulse following the shock wave from the explosive techniques gives rise to certain natural resonances in shallow areas which cause a continuous ringing to render as meaningless any returned echo signals. Additionally, explosive sources waste most of the energy over the entire sonic frequency spectrum while the most useful information is obtained in the range of 10 to 250 cycles per second.

All of the aforegoing acoustic generators, therefore, have limited capabilities and are unsuited for exploratory work in a liquid medium where considerable thrust forces are encountered and sound travels at a rate of approximately 5,000 feet per second in comparison to a speed of twice this value on land. In addition, at the low frequency end of the acoustic spectrum extremely large radiating surfaces are required for the acoustic energy. Communication via modulation over a frequency spectrum is also lacking in that the majority of the generators are of the fixed frequency type.

The primary object of the present invention, therefore, is to provide a new and novel method of and apparatus for the generation of sonic energy which overcomes the aforementioned disadvantages and is adapted for operation over a wide frequency band with a capability for kilowatts or even megawatts of power on a continuous basis in either a solid or liquid transmission medium.

A further object of the present invention is the provision of a new and novel method of and apparatus for the generation of sonic energy with the frequency, amplitude, phase and power level of such energy precisely controlled by an excitation oscillator signal of low power level which is translated into oscillations of a large force and large excursion generator.

Still another object of the present invention is to provide a new and novel sonic source which is readily adapted to underwater seismic exploration and profiling.

Still another object of the present invention is the provision of a new and novel sonic energy transducer means in which the counterthrust forces are equally balanced to result in a transducer of reduced weight and increased power output.

Other objects, features and advantages will be readily apparent after consideration of the following detailed specification and the accompanying drawings in which:

FIG. 1 is a schematic block diagram of the mechanical, electrical and hydraulic components of the embodiment of the invention;

Figure 4:
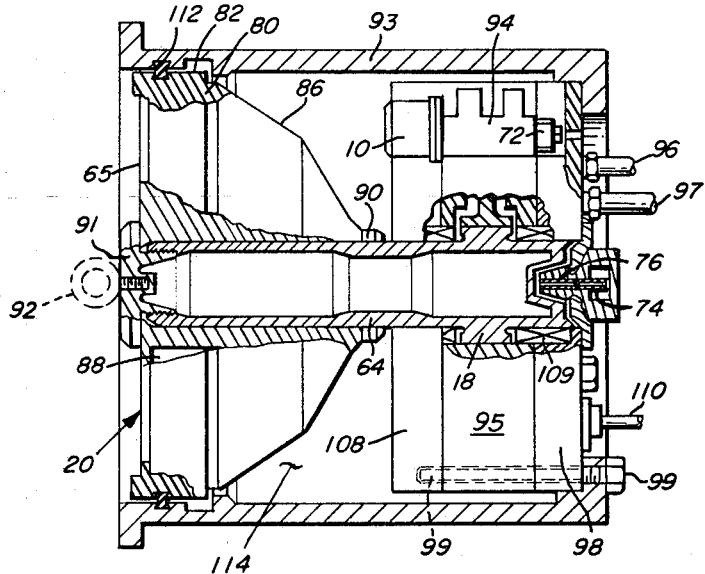
FIG. 4 is a cross-sectional view of an illustrative embodiment of the invention.

In accordance with the teachings of the present invention and referring to FIG. 1, wherein the basic concept is schematically illustrated in block diagram form, the electrohydrosonic transducer may be briefly described as sonic generation apparatus which imparts energy into any elastic medium. The complete system comprises force and motion generation means coupled between the sonic radiator and an inertial rear mass. A hydraulic pump 2 supplies high pressure, filtered oil from a source and is controlled by an electric motor 4 to supply a two stage electrohydraulic servo valve via a high pressure accumulator 6 and pressure reducer 8 interconnected by appropriate hydraulic fluid lines. The electrohydraulic servo valve consists of a torque motor 10, pilot valve 12 and power stage 14. An externally generated low-level electronic signal is amplified in a DC servo amplifier 16 to electromagnetically control the servo valve. The power stage 14 modulates the oil flow to a hydraulic ram 18 with the mechanical response of its piston member tied to the sonic radiator to follow the frequency and amplitude of the remote control signal. By means of electronic negative feedback signals the position and velocity of the sonic actuator, hydraulic ram and power stage are monitored and fed by means of lines 22, 23 and 24 to compensation networks 25 to feed an appropriate electrical positioning signal to the servo amplifier 16. The apparatus disclosed in the present invention is therefore essentially an AC application of a DC positioning servo with the operation throughout the entire mechanical vibration frequency spectrum including stiffness-controlled, resonance or velocity-controlled and mass-controlled regions.

Since the forces generated by the sizes of the operational transducer range in value from kilo-pounds to kilo-tons, the resultant mechanics, i.e., displacement, velocity and acceleration of the system components is derived from a consideration of Newton's well known second and third laws of motion, viz., Force=Mass×Acceleration $$(F=Ma)$$

and forward momentum balanced by the backward reaction $(m_1v_1=m_2v_2)$, respectively. Further motion limitations are imposed by the capabilities of the hydraulic power supply and design geometry of the hydraulic circuitry. The net result is that the frame structure of the transducer can experience large accelerations, for example, those greater than 10 g's which may be of damaging amplitude. It is necessary therefore for the reduction of the generated sonic vibration of the transducer frame to be reduced to safe values by counterbalancing with an inertial rear mass 26. For the purposes of this description the inertial rear mass will refer in some embodiments to the loading provided by means of the weight of the frame structure of the transducer plus additional weight to compensate for the front mass loading. In other cases it is permissible to provide a plurality of force generators vibrating exactly in-phase in a diametrically opposed or back-to-back operation to provide equal collinear forces. In such a case the acceleration of the front mass is counterbalanced by the exactly opposite acceleration in the reverse direction to thereby provide for multiple operation with the frame at rest intermediate to both radiators.

Figure 2:
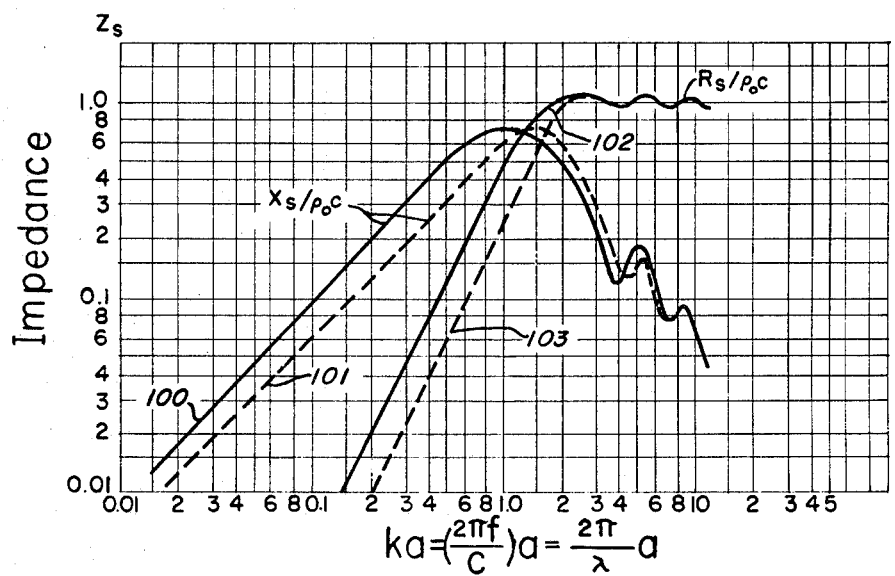
FIG. 2 is a curve plotting radiation impedance of a circular piston.

The acoustic radiation impedance equation $$(Z_s=R_s+jX_s)$$

defining the ratio of the (acoustic pressure, $p$/acoustic particle velocity, $u$) at the surface of the acoustic radiator is well known for a few idealized cases of exemplary radiators. FIGURE 2 illustrates the normalized resistive, $R_s$, and reactive, $X_s$, components, respectively, for the idealized cases of a piston radiator in an infinite baffle curves 100 and 102 and a piston radiator in a long tube curves 101 and 103. The single piston in an enclosure which suppresses radiation from the rear of the piston is considered as a monopole radiator and is represented by the latter case.

In FIGURE 2 $a$ is the radius of the acoustic piston radiator; $k$ is an inverse wavelength parameter defined as $$\frac{2\pi}{\lambda}=\frac{2\pi f}{c}$$

$\rho$ (rho) is the density of the acoustic medium=1.0 gm./cm.$^3$ for water; $c$ is sound velocity in the acoustic medium=1.5×10$^5$ cm./sec. in water; and, $\rho_0c$ is the specific acoustic impedance of the medium=1.5×10$^5$ gm./cm.$^2$-sec. for water. $\rho_0c$ is also defined as the ratio of (acoustic pressure, $p$/acoustic particle velocity, $u$) in a plane wave. However, at the piston face the divergence of the acoustic wave results in a phase lag between the acoustic pressure and acoustic particle velocity, which angle $\theta$ is measured as that whose tangent is the ratio of the (reactive, $X_s$/resistive, $R_s$) components of the normalized radiation impedance $Z_s$ plotted in FIG. 2. Consequently, it follows that the mechanical impedance of the acoustic load on the piston radiator (force, F/velocity, U) as a function of frequency is obtained from FIGURE 2 by simply multiplying the ratio of the specific acoustic impedance by the acoustic piston area.

The acoustic power laws are quite analagous to those governing the familiar electrical circuits, namely $$W=U^2RS=UpS \cos \theta$$

where $W$=acoustic power radiated from a piston of area S,
$U$=piston velocity=$u$, acoustic particle velocity,
$p$=acoustic pressure at the piston face,
$R=(R_s/\rho_0^c)(\rho_0^c)$, from FIGURE 2,
$\theta=\tan^{-1}(X_s/R_s)$, from FIG. 2, the radiation power factor angle.

As an illustrative example I calculate the mechanical parameters associated with the radiation of 1 kw. of acoustic power into water at a frequency of 100 c.p.s. from a radiator 1 foot in radius. From FIG. 2, $ka$ being .14, the normalized acoustic resistance $R_s/\rho_0^c=.01$ and the normalized acoustic reactance, $X_s$ is .14; the acoustic phase angle $\theta$ by which the velocity lags the pressure in the water at the piston face is $\theta=\tan^{-1}(.14/.01)=86°55'$. The area of the 2 foot diameter piston is 2900 cm.$^2$=450 in.$^2$. Consequently, the velocity U becomes $$U=\sqrt{\frac{W}{RS}}=\sqrt{\frac{10^{-10} \text{ dyne-cm./kw.-sec.}}{(.01 \times 1.5 \times 10^5 \text{ gm./cm.}^2\text{sec.})(2900 \text{ cm.}^2)}}$$

Assuming sinusoidal motion, the corresponding peak displacement is $$\frac{U}{2\pi f}=.11 \text{ cm.}=.042 \text{ in.}$$

and the respective peak acceleration is $2\pi fU=43$ g's.

The acoustic pressure $$p=u\frac{Z_s}{\rho_0^c}(\rho_0^c)=u\frac{R}{\cos \theta}=1.4 \times 10^6 \text{ dynes/cm.}^2$$

peak=21 p.s.i., peak. The corresponding force on the 2 foot diameter piston is therefore 9500 lbs., peak.

From the foregoing it is further seen that the velocity and pressure parameters vary as the square root of the required acoustic power output. Furthermore, FIGURE 2 shows that at low frequencies, that is below the knee of the radiation resistance $R_s$ curve, or where $ka$ is less than 1, the specific acoustic resistance varies as the square of the frequency and the reactive component varies as the first power of the frequencies. Another viewpoint regarding $ka$ is that it is a measure of the radiator circumference in wavelengths at high frequencies. It is evident therefore that at high frequencies, or where $ka$ is much greater than 1, the resistive term is dominant and the radiation impedance is independent of frequency.

It must be noted that in previous discussion this acoustic radiation analysis has been completely general with no regard as to the motive or driving technique employed to actuate the piston radiator, that is to say, the linear motor or driver may have been piezoelectric, magnetostrictive, electrodynamic or electrohydraulic. However, a further consideration of the foregoing analysis will disclose that in the low frequency region of operation, the acoustic load impedance, that is, the (force/velocity) requirement becomes more compliant as the frequency is decreased. Specifically, at low frequencies it varies inversely as the square of the frequency.

The net result of this discussion is to show that a low frequency, broad band radiator requires a driving motor of variable driving point impedance in order to match that of the variable acoustic load. At low frequencies the driver must be comparatively compliant and that relatively large velocities and excursions are necessary for the radiation of acoustic power. On the other hand, at the high frequencies the driver must be mechanically quite stiff to supply the increased force and pressure demands at lower velocities and excursions.

For this reason, the piezoelectric and magnetostrictive drivers which are inherently quite stiff in that they generate large pressures but relatively small excursions are not suitable for use as transmitters of low frequency energy. Furthermore, the tuning feature which forces these devices to operate at resonance automatically precludes their operation over a wide band of frequencies, that is, over a band greater than an octave.

The electrodynamic or loudspeaker type driver has the necessary frequency range of several octaves to be classified as a broad band transmitter. However, this driver which employs magnetic forces is basically limited to tensions of less than 100 lbs./sq. in in its working air gap. Such a machine would therefore be extremely bulky when employed to generate the large forces required by the high acoustic power levels under consideration in this disclosure.

The mechanical eccentric type vibrators wherein rotating electric motors or combustible fuel engines are employed as drivers have a wide design range of stroke and force capabilities. However, the response time of the comparatively large rotating masses in the motor armature or engine flywheel plus the counter-rotating weights or crank arm makes a change in frequency very slow.

The present invention broadly stated obviates the aforementioned disadvantages of prior art devices. The principal features of the electrohydrosonic transducer disclosed herein follow:

(1) high force capability ranging to kilo-tons, long stroke capability measured in inches, adaptability to a wide range of mechanical and acoustic load impedances;

(2) broad band frequency range of operation over many octaves ranging from DC up to several thousand cycles per second;

(3) fast transient response including single pulses, simultaneous complex steady state frequency signals, and/or intelligible voice communications;

(4) independent power level and frequency controls, dynamic range of over 30 decibels;

(5) capable of being disposed in arrays of multiple modules, each module generating several kilowatts, and being individually phased and controlled for beam directivity.

Figure 3:
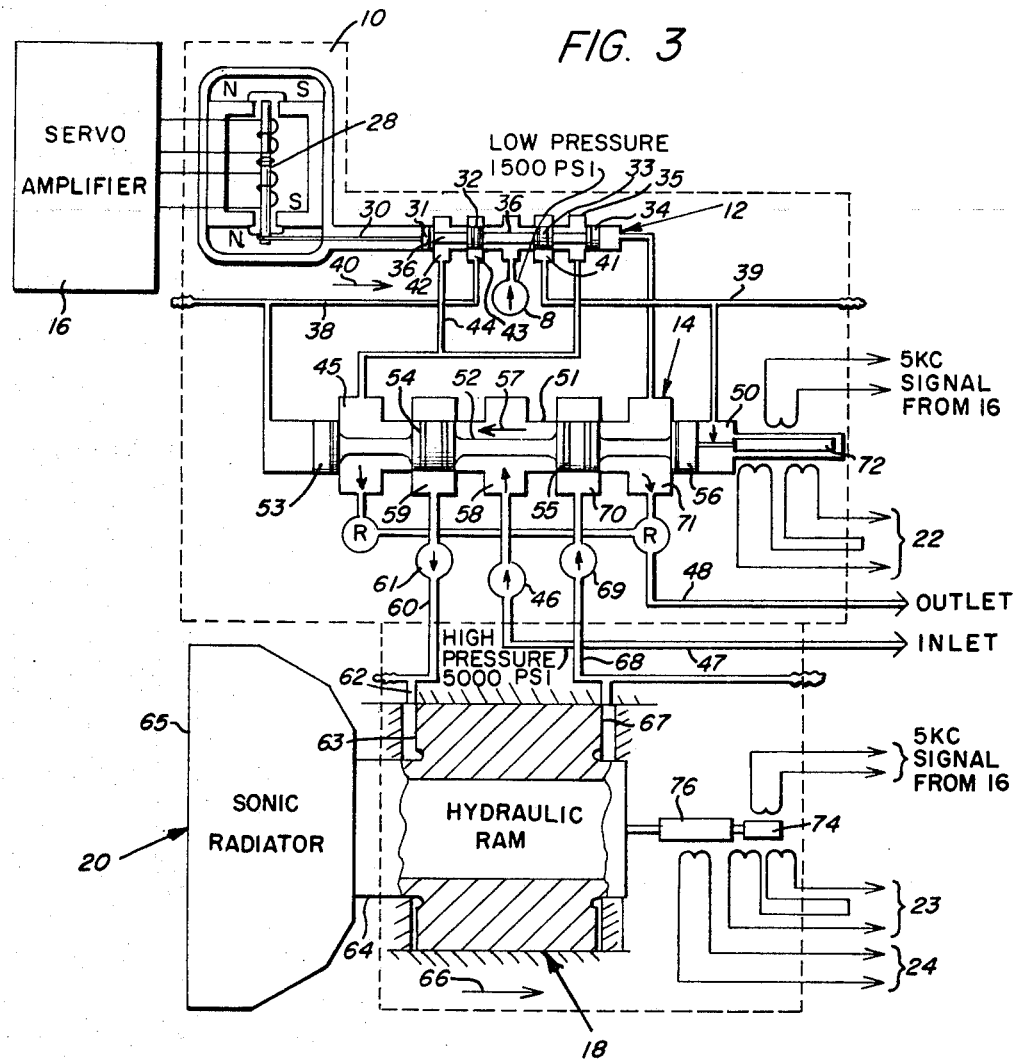
FIG. 3 is a schematic diagram of the electrohydraulic servo valve with associated piping.
Figure 5:
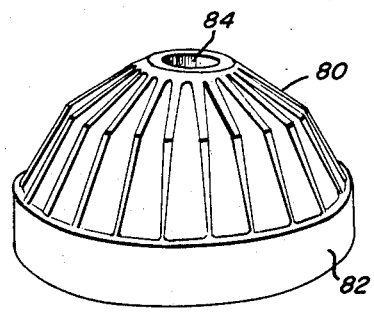
FIG. 5 is a perspective view of the internal construction of the sonic radiator.

Referring next to FIGS. 3, 4 and 5, the illustrative embodiment of the invention will be described. In the electrohydraulic servo valve a small angular deviation of spring-controlled pivoted armature 28 is translated by means of push-pull rod 30 into linear reciprocating motion of valve spool 36 having a plurality of leads 31, 32, 33 and 34 in the first or pilot stage housed within the casing 35. Each of the leads is provided with pressure equalizing grooves in the manner well known in the art. Hydraulic fluid from reduced pressure supply 8 and feedlines 38 and 39 is thereby controlled by the positioning of the valve. Movement to the right indicated by the arrow 40 results in the flow of pressurized fluid through port 41, through feedline 39 to port 50 of the power or second stage 14. The open-headed arrow in the respective feedlines indicates the direction of fluid flow. Fluid will also flow between ports 42 and 43 and respective feedlines 38 and 44 to port 45 of the power stage 14 to provide flow through the return path indicated by R to the hydraulic sump and accumulator by means of line 48. High pressure hydraulic fluid at a substantial pressure, for example, 5000 p.s.i., is supplied by reservoir 46 with the flow directed from high pressure accumulator 6 through feedline 47.

The power stage 14 comprises casing 41 enclosing spool valve 52 defining lands 53, 54, 55 and 56. Pressure equalization grooves similar to the pilot stage valve lands may also be provided. Introduction of low pressure hydraulic fluid in port 50 results in the movement of valve 52 to the left as indicated by arrow 57. This linear movement positions the valve lands in such a manner that high pressure fluid from the accumulator at the pump supplied through reservoir 46 will flow through ports 58 and 59 to feedline 60 and thence to inlet port 62 to contact surface 63 of ram actuator 18. Since ram 18 is rigidly coupled to piston shaft 64 which in turn is secured to the large substantially bell-shaped sonic radiator 20 movement of this member to the right as indicated by the arrow 66 follows the corresponding movement of the pilot spool valve 36 and torque motor armature 28. During this cycle of the flow modulation the hydraulic fluid on the opposing surface 67 is rapidly dumped through feedline 68 to port 70 of the power stage. Thence the flow is continued to port 71 and line 48 to the outlet and then back to the pump 2. Reversal of this operating cycle will result in reversal of the direction of flow and movement of the ram controlled piston radiator to the left. A pressure differential is thereby established on either side of the ram actuator 18 by reciprocating modulation of the high pressure hydraulic fluid to result in reciprocating motion of the sonic radiator as a result of the conversion of an electrical signal into AC hydraulic fluid oscillation.

Although the operation of the over-all system is always close-looped, the main components have been illustrated schematically in FIG. 3 as open-looped for simplicity. The electrohydraulic servo valve consisting of the torque motor, pilot stage and power stage combines to modulate the oil flow to the piston ram 18. A five kilocycle carrier signal is utilized to excite a plurality of electric feedback signal means with amplitude modulation impressed thereon to result in output signals representative of the information necessary for the positioning of the critically dependent moving components of the over-all system necessary for the careful control and modulation of the output sonic energy. By means of linear variable differential transformers or LVDT's the power stage valve spool and hydraulic ram are positioned electrohydraulically by means of the feedback signals. As a result a departure from the use of mechanical springs is evident to thereby avoid the inherent problems of mechanical resonance of such spring actuated devices. A null point or center of oscillation of the free-floating power valve spool and hydraulic ram between their respective ports is essential to the operation of the over-all apparatus. An LVDT pickup 72 disposed at one end of the valve spool is fed by means of electrical connection line 22 to the servo amplifier 16 to monitor the operating position of this moving component. If the linear actuation of the valve spool 52 fails to conform to the desired position relative to the torque motor armature 28 and associated pilot valve spool 36 an error signal may be utilized through the feedback loop to the servo amplifier to achieve the desired positioning. The hydraulic ram position is also controlled electrically by a signal generated in the LVDT 74 and fed through lines 23 back to the servo amplifier 16. Both of these position indication means are responsive down to DC in the generation of output signals which are directly proportional to displacement. These signals are then phase sensitive demodulated into polarized proportional DC signal components which are fed through summing circuits with appropriate gain adjustments. Such electronic circuitry is well known in the art and will not be described in detail in this specification. The only AC functional feedback signal applies to the velocity pickup 76 with feedback connections 24 to indicate the velocity of the actuation of the coupled sonic radiator. This signal is essentially viscous damping signal to improve the transient and high frequency response of the generated sonic energy. The compensation networks in the feedback loops are employed to provide special frequency response functions or corrections.

Additional pickups, analog-to-electrical, may be located in other parts of the system to perform various functions. Hence, if the over-all generation means is employed in a positive electrical signal feedback method involving the resonance frequency of a component of the sonic load, monitoring of this frequency from the resonant member of the structure by a sensor 150 such as a geophone or hydrophone in the medium coupled through the sonic actuator to lock the input electrical signals to the resonance frequency of the member to which the energy is applied may be desirable.

Since the fundamental consideration in the transducer apparatus of the invention is the transfer of the generated energy into the appropriate medium the principal parameters to be evaluated are the radiation impedance requirement and radiating surface rigidity. The stiffness of the hydraulic fluid in the system is the driving means which must be efficiently coupled to the sonic radiator with all due consideration for the bending, shearing and direct compression loading imposed by the medium on the radiator. When employed in a liquid body such as water for the generation of sonic energy the weight of the mass adjacent to surface 65 for illustrative purposes has been calculated for a two foot diameter radiator to be approximately 140 pounds. To minimize surface deflection for such a moving mass a substantially bell-shaped radiator was determined to provide the most efficient structure. Convex-shaped radial ribs 80 are circularly disposed and secured to cylindrical member 82 with a central axial passageway 84 defined to receive the hydraulic ram actuated piston shaft 64. For the selected diameter dimensions of the illustrative embodiment for radiation of acoustic energy, 24 such radial ribs 80 were determined to provide the necessary stiffness and impedance compliance for thrusts as high as 56,000 pounds. The rib members are enclosed by the wall members 86 to thereby render the over-all radiator structure watertight and define a plurality of chambers 88 between adjacent rib members.

An exemplary assembly of the invention will now be described together with the manner of coupling the oscillating hydraulic piston ram member and the sonic radiator, reference being had to FIG. 4. The hydraulic actuated piston shaft 64 extends through the passageway 84 defined in the sonic radiator 20 and a collar member 90 is threadably secured to the exterior piston shaft wall at an intermediate point while a solid flat head screw 91 is internally threaded at the external end of the piston shaft to couple the sonic radiator to the hydraulic actuator. An eye bolt 92 is externally mounted in the screw 91 to facilitate movement of the over-all apparatus which may have a rather substantial weight of approximately one ton or more. The transducer housing 93 provides a water tight and pressurized enclosure means for the major components of the apparatus disclosed herein. The assembly of the torque motor 10 connected to the electrohydraulic servo valve, which will be collectively referred to as 94, to include the pilot stage 12 and power stage 14, is mounted within a notch defined in cylinder 95. The power spool valve position pickup LVDT 72 is externally mounted on the electrohydraulic servo valve. The high pressure hydraulic fluid inlet line 96 and low pressure hydraulic outlet line 97 are threadably secured to the end mass member 98 which is in turn secured to the flanged end portion of the transducer housing by means of bolts 99. A similar end mass member 108 contacts the opposing planar surface of the cylinder 95 to collectively define the inertial rear mass required for monopole operation of the over-all transducer as will be hereinafter explained. The ram actuator 18 is slidably disposed on a bearing surface 109 and the position LVDT 74 and sonic radiator velocity pickup 76 are in axial alignment with the actuator piston assembly. The various electrical signal feedback lines are coupled through cable 110 to the DC servo amplifier which is remotely positioned relative to the transducer along with the hydraulic fluid supply and bulky system components.

The combined mechanical mass of the reciprocating vibrating ram actuator and piston shaft together with the sonic radiator for an aproximate two foot diameter radiating surface is approximately 400 lbs. If the transducer housing was similarly weighted the directivity of the radiation pattern of the sonic energy would be in the commonly referred to pulsating sphere mode of operation to radiate energy uniformly in all directions or omnidirectionally. To concentrate the radiated energy into a desired direction and to take advantage of the directivity patterns of monopole radiation an inertial rear mass in a ratio of approximately five to ten times that of the front moving mass including the medium adjacent to the radiator surface is necessary. In the present invention this inertial mass is provided by transducer end mass members 95, 98 and 108 as well as the housing 93 and related components in the range of 2000 to 4000 lbs. exclusive of the moving mass weight. A rather substantial transducer apparatus for imparting broadband sonic energy into a liquid medium will therefore evolve where monopole radiation is preferred.

In addition, it is necessary that the back portion of the sonic actuator 20 be maintained watertight and a flange-clamped rubber I ring seal 112 is circumferentially positioned and joined between the moving radiator and transducer housing 93. Deep submergence of the transducer apparatus is also a desirable feature in view of the excellent propagation characteristics where long range propagation of sonic energy is desired for long range communications. By means of introducing pressurized air into the interior of the housing indicated generally by the numeral 114 a positive pressure differential of between 3 to 5 lbs. per square inch with respect to the pressure exerted by the ambient water may be maintained. Further structure may be affixed to the transducer housing 93 such as lifting brackets welded thereto or other suspension means dictated by the manner of directing the active radiator surface in the utilization of the over-all embodiment in any elastic media.

Figure 6:
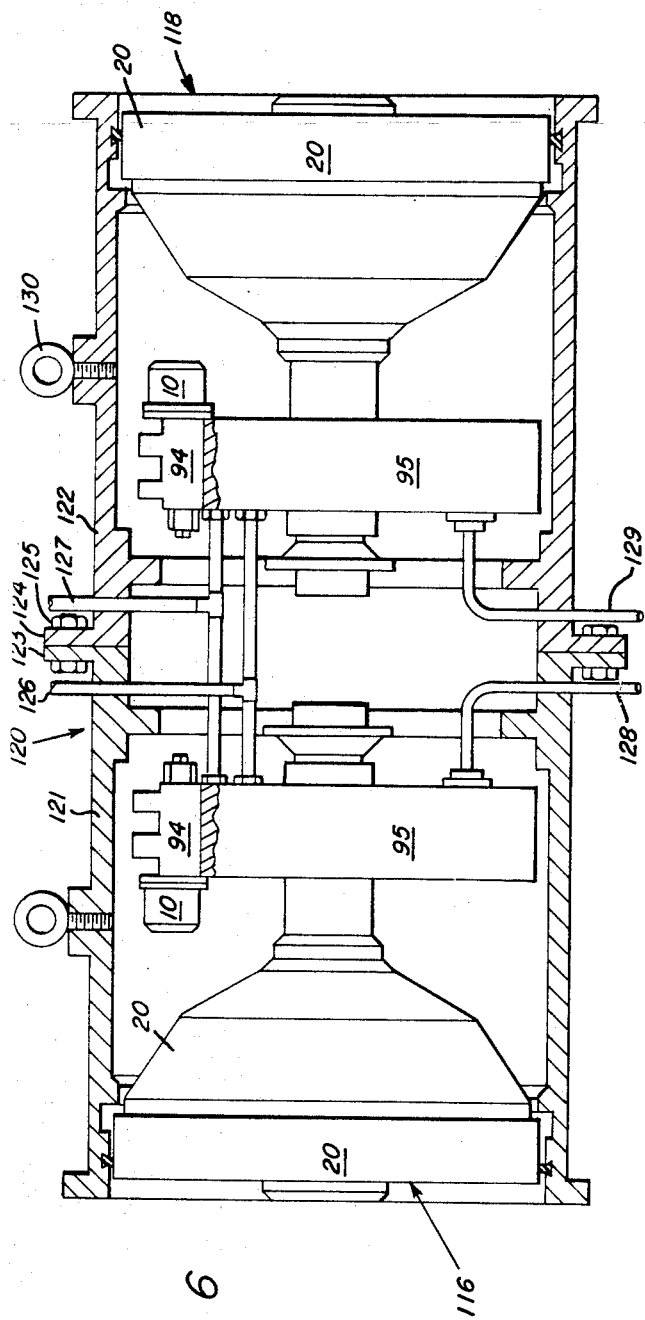
FIG. 6 is a perspective view partly sectionalized of an alternative embodiment.

With the provision of the inertial rear mass the force reaction exerted by the impedance of the load plus the forward acceleration of the transducer front moving mass comprising the hydraulic actuated member and sonic actuator is counterbalanced by the force necessary to accelerate the rear mass in the opposite direction. In applications of the embodiment of the invention requiring a tight coupling between the transducer apparatus and the earth the rear mass may be omitted since the motional node is in the earth. In some applications a substantial reduction in weight may be achieved by the elimination of the large inertial rear masses by operating a plurality of transducer force generators exactly out of phase to generate equal collinear forces in diametrically opposed directions. In this case the node will be found mid-way between the two transducer assemblies. In FIG. 6 an alternative embodiment is shown incorporating this feature. Transducer assembly 116 with a reduction in the weight of the previously described end mass members is mounted in a backto-back relationship with a similar transducer assembly 118 within a housing 120 formed by the mutual coupling of sections 121 and 122 by means of flange members 123 and 124 secured thereto by bolts 125. Common feed lines for the high pressure hydraulic fluid 126 and the low pressure hydraulic fluid outlet 127 are brought out through the side of the housing to the remote source. Similarly, separate electrical cable lines 128 and 129 are provided or, if sufficient isolation is provided, a common electrical cable may be employed. The combined back-to-back transducers may be suspended by means of eye bolts 130 secured to the housing sections 121 and 122. This configuration will result in operation closely resembling that of a pulsating sphere for use in certain countermeasures as well as seismic exploration applications.

Figure 7:
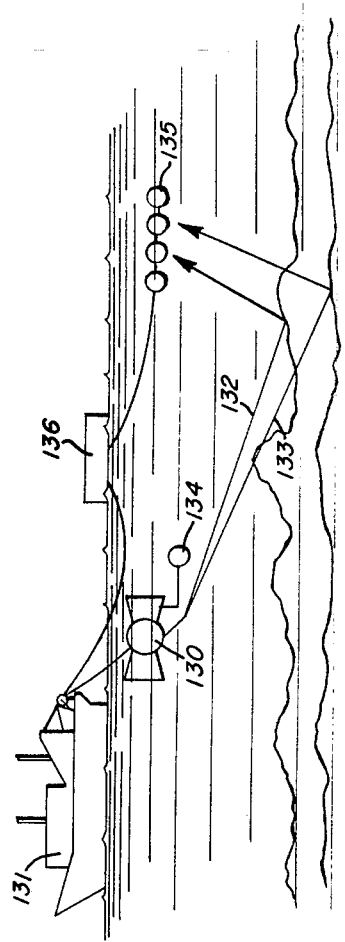
FIG. 7 is a pictorial representation of one of the uses of the embodiment of the invention.

FIG. 7 illustrates the application of the invention in the field of geophysical prospecting and seismic profiling. The low frequency, broad band, steady state sonic source disclosed herein readily lends itself to the generation of transmission signals which are reflected from varying layers with cross correlation of the return signals to indicate composition of subterranean surfaces. The source 130 which has been pictorially illustrated as the back-to-back embodiment to thereby reduce the inertial rear mass requirements may be towed behind a vessel 131. The hydraulic power supply, amplifiers and electronic circuits for the recording of data may be carried aboard the vessel. While the omnidirectional type of sonic radiator has been depicted, it is understood that this is for illustrative purposes only and that suitable modifications in the embodiment of the invention may be practiced as will be hereinafter enumerated for the purpose of producing unidirectional signals where desired. Lines 132 and 133 are therefore merely indicative of the desired directivity of the source signals in geophysical techniques. The source may also be disposed at any desired depth to thereby avoid some of the disadvantages of cavitation which may arise short distances from the surface of the water as well as ship noise in the transmitted acoustic energy. A monitoring hydrophone 134 generates a signal which is stored for future reference in cross correlation electronic techniques which need not be discussed in the present application. The reflection signals are received by a hydrophone array 135 suspended below the surface of the water by a float 136 also towed by the vessel. Such signals are amplified, filtered and correlated with the reference signal by means of recorders and extensive electronic equipment in accordance with time delay techniques to indicate the character of the underlying surfaces. It is understood in the practice of the present invention that stationary as well as portable applications will be permissible.

A useful sonic energy source generator is therefore disclosed whose capability is limited only by mechanical and electrical capabilities of the state of the art in the generation of the vibratory and hydraulic fluid energy and load coupling of the radiator. While a planar radiator surface has been indicated, a curved surface may be desirable in certain applications to provide further variations in directivity patterns. From an operational standpoint the electrohydrosonic transducer apparatus is a versatile low frequency broad band, electronically controllable sonic energy transmitter. In an actual embodiment a hydraulic power system capable of generating 100 H.P. at 3000 to 5000 pounds per square inch with a 35 gallon per minute delivery rate was coupled to a single radiator having a two foot diameter and a ±.054 inch stroke applied to the radiator surface. The total radiated energy with rho—c loading was over 30 kw. and with an array of individual transducers power in terms of megawatts is available for any application.

The pressure compensation feature allows operation at depths in the range of 4000 feet in a liquid medium to take advantage of the so-called Sofar channel phenomenon for longer distance communications. The import of this deep submergence feature may also be appreciated when one considers that at a short distance from the surface the sound intensity is limited to values below the cavitation threshold. The limit is approximately 2 watts per square inch of radiating surface. Hence, to radiate 1 megawatt of power near the surface a radiating area of approximately 60 feet square is required. At the 4000 foot depths or at a hydrostatic pressure of 2,000 p.s.i., cavitation is of no consequence and a transducer is limited only by the requisite mechanical excursion of the radiator. This value increases in inverse proportion as the frequency decreases. For a plane wave with an acoustic intensity of 65 watts per square inch, the acoustic particle peak-to-peak excursion at roughly 100 cycles per second is $59/1000$ of an inch. The acoustic pressure wave becomes 80 pounds per square inch and the one megawatt radiating area required may now be reduced to a 10 foot square or a factor of six.

The frequency response of the embodiment of the invention is limited only by its stroke, power supply flow capacity, hydraulic supply power and pressure rating, and compliance-mass resonances of the fluid and moving load. The operation is essentially linear and the power output is therefore proportional to the power input. It is possible to increase the generated energy by increasing the radiator surface area and thereby increase power in proportion to the square of the radiator surface area. A further gain in output is realized by mounting the transducers in an array closely spaced at less than one-half wavelength spacing. Such an array in effect produces a combined circumference which is the equivalent of a larger radiator surface area thereby increasing the power output proportionally. Other techniques enhancing acoustic energy radiation may also be practiced. One such technique includes the use of a large baffle which has the effect of doubling the resistive portion of the radiation impedance and consequently the power output over that of the unbaffled radiator. Another method of utilizing the power generating capabilities of the invention is to increase the power factor of the radiation impedance loading by means of an exponential horn whereby the radiating area is effectively increased by the ratio of the horn's mouth-to-throat areas.

It is understood that while specific embodiments of the invention have been illustrated and described herein, such description is not intended to limit the spirit and scope of the broadest aspects of the present invention as set forth in the appended claim.

What is claimed is:

An electrohydrosonic transducer for imparting broad band, low frequency vibrational energy into a plastic medium comprising:

electrohydraulic servo valve means for oscillatory modulation of flow of entrapped high pressure fluid in response to excitation of low power level electrical control signals from an external source, said servo valve including a hydraulically loaded neutral positioning means;

a mechanical member communicating with said modulated fluid flow to closely follow the oscillatory movement;

a sonic radiator member rigidly coupled to one end of said mechanical member having a surface area in contiguous relationship with the elastic medium to translate the oscillatory movement of the mechanical member into displacement of the medium adjacent thereto;

said radiator surface area providing an acoustic radiation impedance wherein the reactive component exceeds the resistive component of said impedance;

said low power level electrical control signals derived from negative electrical feedback signal means to provide a DC positioning reference for the oscillating movement of said sonic radiator member and mechanical member;

and positive feedback electrical signals from a sensor in the elastic medium automatically locking the frequency of the transducer to the resonant frequency of the coupled medium.

References Cited

UNITED STATES PATENTS 2,955,460  10/1960  Stevens et al.
3,056,104   9/1962  De Kanski et al. ____ 340—8 X

OTHER REFERENCES

Hunter, Acoustics, 1957, pages 158–163, Radiation Impedance of a Piston, Prentice-Hall, Inc.

RODNEY D. BENNETT, *Primary Examiner.*
CHESTER L. JUSTUS, *Examiner.*
B. L. RIBANDO, *Assistant Examiner.*

UNITED STATES PATENT OFFICE
CERTIFICATE OF CORRECTION

Patent No. 3,349,367                      October 24, 1967

Serge S. Wisotsky

It is hereby certified that error appears in the above numbered patent requiring correction and that the said Letters Patent should read as corrected below.

Column 4, after line 45, insert -- =48 cm/sec, rms =67 cm/sec, peak =27 in/sec, peak. --; column 6, line 12 for "41" read -- 51 --.

Signed and sealed this 6th day of May 1969.

(SEAL)
Attest:

Edward M. Fletcher, Jr.
Attesting Officer

Commissioner of Patents